United States Patent
Acharya

[19]

[11] Patent Number: 6,091,851
[45] Date of Patent: Jul. 18, 2000

[54] EFFICIENT ALGORITHM FOR COLOR RECOVERY FROM 8-BIT TO 24-BIT COLOR PIXELS

[75] Inventor: Tinku Acharya, Tempe, Ariz.

[73] Assignee: Intel Corporation, Santa Clara, Calif.

[21] Appl. No.: 08/963,525

[22] Filed: Nov. 3, 1997

[51] Int. Cl.[7] .............................. G06K 9/00; H04N 9/07; H04N 3/14

[52] U.S. Cl. .......................... 382/167; 348/266; 348/272

[58] Field of Search ................................... 382/167, 199, 382/205; 348/266, 272, 273, 277, 222, 242

[56] References Cited

U.S. PATENT DOCUMENTS

| | | | |
|---|---|---|---|
| 4,630,307 | 12/1986 | Cok | 382/165 |
| 4,642,678 | 2/1987 | Cok | 348/242 |

*Primary Examiner*—Thomas D. Lee
*Assistant Examiner*—Wenpeng Chen
*Attorney, Agent, or Firm*—Blakely, Sokoloff, Taylor & Zafman LLP

[57] ABSTRACT

What is disclosed is method that interpolates missing color components for an original pixel by utilizing color medians for surrounding blocks of green pixels. A new pixel is output which has complete color information which is a function of the original pixel and interpolated color components. The interpolated pixel is a true representation of both luminance and chrominance information.

9 Claims, 4 Drawing Sheets

EFFICIENT ALGORITHM FOR COLOR RECOVERY FROM 8-BIT TO 24-BIT COLOR PIXELS

BACKGROUND OF THE INVENTION

In digital cameras and imaging devices using only a single electronic sensor, the image color is captured by sub-sampling typically in three (Red, Green, Blue) color planes. In such cases, the original "raw image" is captured with each "raw image pixel" composed of only one of three vital color/intensity components: either R, G, or B (Red, Green, or Blue). But for image rendering devices (such as a monitor or printer), full color resolution is desirable. Recovery of full color information from this sub-sampled color is popularly known as color interpolation.

The following description refers to raw image pixels as either "pixels" or "raw image pixels". Pixels that are formed by virtue of a completed color interpolation technique will be referred to as "full color pixels". In digital still and video cameras and certain other imaging devices, raw images are first represented as rectangular row and column of pixels with each pixel having the intensity value of a particular color only. In the case of RGB (Red, Green and Blue) sub-sampling imaging devices, images are obtained and stored in a "Bayer" pattern. The Bayer pattern, when three color planes are sub-sampled using a color filter array (CFA), is characterized by including on a first row of an image, alternating pixels of Red and Green, and then on a next row alternating pixels of Blue and Green. Thus, the Bayer pattern for the first four rows of pixels (with each pixel typically an 8-bit value) is as follows (with the rows thereafter repeating the same pattern):

G R G R G R . . .
B G B G B G . . .
G R G R G R . . .
B G B G B G . . .
•
•
•

As a result, each pixel location contains a value for a single color only. Assuming, as is the case in some imaging devices, that each pixel of the Bayer pattern has 8 bits of resolution (i.e., the pixel is a value representing the intensity of the color ranging from 0–255), then a "full color" pixel, one having R, G and B components would be a 24-bit value. To recover the two missing color components for each pixel, a color interpolation or color recovery is employed.

In color interpolation, an attempt is made to combine in some fashion neighboring pixel(s) to reconstruct, recover, or predict missing color component information for a given raw image pixel. Several prior art interpolation methods are described in "*Interactions Between Color Plane Interpolation and Other Image Processing Functions in Electronic Photography*", James E. Adams, Jr., SPIE, (The International Society for Optical Engineering), Vol. 2416 (Electronic Imaging '95), pages 144–155 (July 1995), with most of these employing pixel averaging techniques to recover missing color components. At its simplest, a prior art averaging technique would interpolate the Red component of the captured Green pixel at row 2, column 2, (referring to the 8-bit Bayer pattern above) as the average of the two nearest red pixels, i.e., Red pixel at row 1, column 2 and the Red pixel at row 3, column 2. Likewise, the Blue component of the same captured Green at row 2, column 2 would be interpolated under an averaging technique as the average of the two nearest Blue pixels, i.e., the pixel at row 2, column 1 and the Blue pixel at row 2, column 3. The Blue and Red interpolated components are then combined with the original captured Green value of the pixel, row 2, column 2 to form a new pixel which is composite "full" color pixel. The resultant "RGB" full color pixel is an approximation or prediction of the original object's true color at that relative pixel location.

This averaging technique is crude in that the most visually critical information, such as edges, are decimated. If the pixel whose missing components are being interpolated lies on a edge boundary, then the averaging of pixels of corresponding color on each side of the boundary may cause that component to be a highly inaccurate version of the actual uncaptured color component. The edge, for that component would thus disappear. The response of the human visual system (eye, brain, etc.) to edge information is very acute, and thus, the blurriness of edge(s) will greatly detract from the perceived overall quality (sharpness, resolution, etc.) of an image. Further, other averaging techniques that attempt to detect patterns or edges are complex to implement in high-speed rendering applications. In these techniques, different formulas for averaging known as predictors are employed even within the same image depending on detected local patterns within the image. These techniques are not very efficient and further, if color components are interpolated when the pixels are being output, these techniques slow down the process of displaying or rendering pixels of an image into a display device. Averaging techniques produces images that are "soft" and not very crisp when viewed. Further "luminance" information contained in the Green pixels (which comprise 50% of the image according to the Bayer pattern) are a less significant factor than they should be when interpolation is carried out in the prior art techniques. The luminance information is greatest in Green pixels since Green is already a combination of two primary colors, Yellow and Blue. Thus, in terms of visual perception, Green contains more information about the original color of an area of pixels or pixel in the image than do Blue or Red pixels.

Thus, there is a need for an efficient color interpolation technique that more accurately reconstructs the original object color by taking into better account luminance information contained in Green pixels.

SUMMARY OF THE INVENTION

An interpolation method is disclosed for a raw image composed of pixels that utilizes color medians of surrounding blocks of Green pixels in order to select neighboring pixels to attain missing color components for a raw image pixel. A new pixel is formed that has full color information which is a function of the raw image pixel and the interpolated color components.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
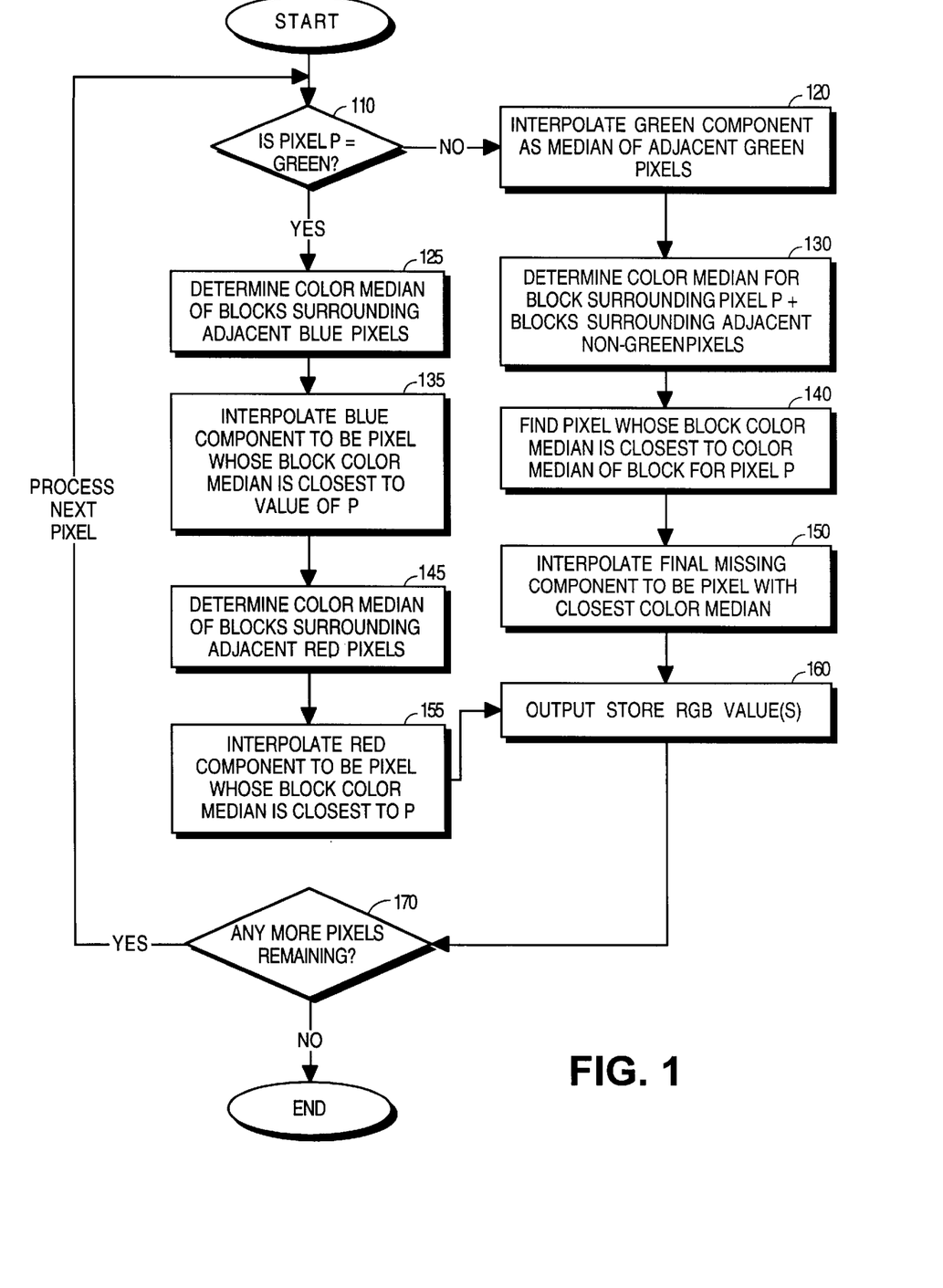
FIG. 1 is a flow diagram of color interpolation methodology according to one embodiment of the invention.

FIG. 1 is a flow diagram of color interpolation methodology according to one embodiment of the invention.

The improved method of color interpolation disclosed herein is advantageous in better overcoming the blurriness effect over averaging-type interpolation techniques and also, in relating each raw image pixel's missing components to more relevant color information. Thus, various embodiments of the invention define a parameter referred to as the "color median", and based on the color median, the technique selects one neighboring pixel (with the same color as the sought-after missing color component of the raw image pixel under consideration) over another same color neighboring pixel to be interpolated as the missing color component. The utilization of the color median allows the intelligent selection of an entire neighboring pixel value to compose the missing color component. In the averaging-type techniques of interpolation, an averaging of values that are highly uncorrelated from one another creates pixel artifacts by introducing colors not guaranteed present in the raw image. By contrast, various embodiments of the invention describe selecting one of the neighboring pixels as the missing value, based on image characteristics such as color median (defined below). This improves the overall visual quality of the image, better preserves edges and more accurately represents colors present the original object which was captured by the imaging device. Artifacts are diminished since the selected component is actually present in the captured original image.

The techniques discussed below in the various embodiments of the invention determine the color median for each block of pixels surrounding the pixel under consideration for selection. Essentially, the pixel surrounding the block of pixels with the "closest" color median to the color median of the block of pixels surrounding the raw image pixel for which the missing component is being interpolated is chosen to be that missing component.

In one embodiment of the invention, an ordered set of four pixels $\{X_1, X_2, X_3, X_4\}$, particularly wherein each $X_1$, $X_2$, $X_3$, $X_4$ is a Green pixel, constitutes a "block" for whom color median is determined. The pixel block $\{X_1, X_2, X_3, X_4\}$ surrounds adjacently the raw image pixel for which color median is determined. The "color median" for a block of pixels is represented hereinafter as $\tilde{X}$. When $X_1$, $X_2, \ldots, X_N$ is an ordered set of values such that each $X_i \leq X_{i+1}$ for all i in the range [1, N–1], the median $\tilde{X}$ of the set $[X_i \ldots X_N]$ is M such that if N is odd $M = X_{(N-1)/2}$ and if N is even $M = (X_{N/2} + X_{N/2+1})/2$. To guarantee these values M are the statistical median $\tilde{X}$, the set $[X_1, \ldots, X_N]$ must be an ordered set of values. If each color block is chosen to contain only Green raw image pixels, then regardless of the color (R, G, or B) of the component being interpolated, only Green raw image pixel values are considered in calculating the color median. This more significantly utilizes luminance information in making the selection of which raw image pixel is to be used as the missing color component. In essence, the median for one block of Green pixels, of which there are always four adjacent neighbors for any (R, G, or B) pixel [except at image boundaries] in the 8-bit Bayer pattern, is compared against color medians for other blocks of Green raw image pixels in determining which surrounding raw image pixel to select in interpolating the missing color component. When all missing color components are interpolated for each raw image pixel, these components are combined with the raw image pixel to form a full color pixel that has R, G and B information.

One embodiment of the invention is in FIG. 1. In this embodiment, a Green raw image pixel is treated slightly differently than Red and Blue raw image pixels when interpolating its other missing color components. For this reason, the methodology first checks if the raw image pixel P for whom missing color components are being interpolated is Green or not Green (step 110). Since a Green raw image pixel already contains its own luminance information, it is treated differently than a non-Green raw image pixel such as Red which must obtain luminance information from surrounding pixels.

If the pixel is not Green, then a Green component as well as one of either Red or Blue color components is missing in the pixel. The missing Green component will be interpolated as the median of adjacent Green pixels (step 120). Given an 8-bit Bayer pattern, this implies that the Green component will be interpolated as a median of north, south, east and west adjacent pixel values (see FIG. 2 mapping) whether the pixel P for which color components are being interpolated is a Blue or Red pixel. The raw image pixel P for which missing components are being interpolated, has only one final missing component, since Green is interpolated at step 120 and since the pixel P already contains one of either Red or Blue color information.

To interpolate the missing Red component (if pixel P is Blue) or the missing Blue component (if pixel P is Red), the first step is to determine the appropriate color median values. Thus, according to step 130, the color median for the Green block surrounding pixel P and the color median for the Green blocks surrounding each adjacent non-Green pixel is determined. In a Bayer pattern, a non-Green pixel P will have 4 diagonally adjacent pixels of the same color as the missing component being interpolated. Thus, if pixel P is Red (i.e., missing a Blue component), the northwest, southwest, northeast and southeast adjacent pixels will by default be Blue pixels (see FIG. 2). The color median for a block of Green pixels, in this embodiment of the invention, is determined for each of those adjacent non-Green pixels (step 130). Once all color medians have been determined, the next step is to find the pixel whose surrounding block's color median is the "closest" to the color median of the block surrounding pixel P (step 140). The term "closest" as used herein when describing the various embodiments of the invention refers to one value that has the minimum absolute value distance (difference) to another value. Thus, each color median for blocks surrounding the adjacent non-Green pixels is subtracted from the color median of the block surrounding pixel P. The minimum of these differentials, in an absolute value sense, is the "closest" color median to that of the block surrounding pixel P. The final missing component is interpolated to be the adjacent raw image pixel whose surrounding block color median is closest to the color median of the block surrounding raw image pixel P (step 150). Finally, with each R, G, and B accounted for, the value(s) for each color component is/are stored to a storage medium or output to be rendered to a display device to form a full color pixel (step 160).

Figure 2:
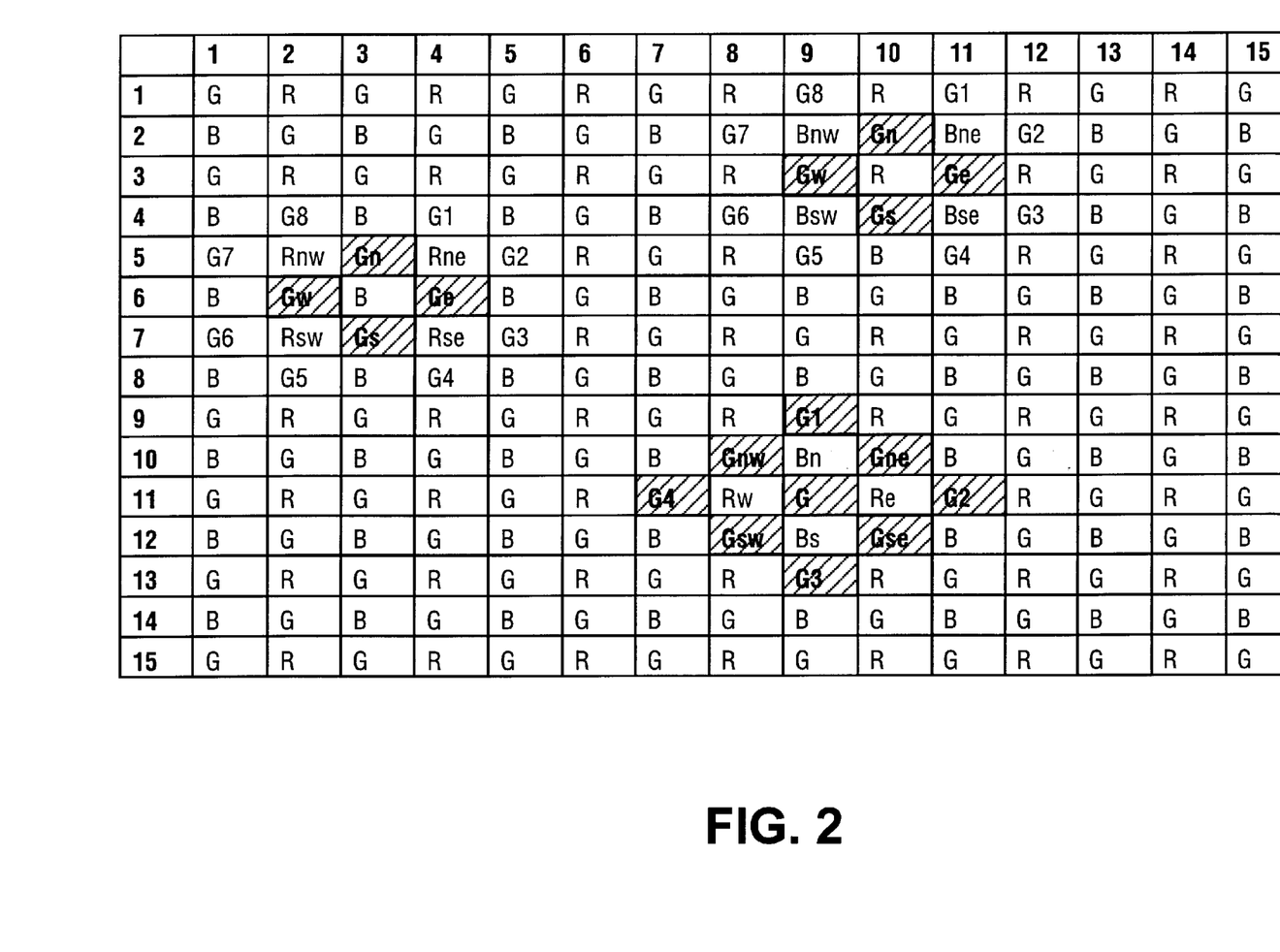
FIG. 2 is an exemplary pixel map illustrated to explain color interpolation according to one embodiment of the invention.

Referring again to step 110, if the pixel P is Green, then a different methodology is used to interpolate the missing Red and Blue components. Since both Red and Blue components are missing, they may be interpolated in any order, but the methodology shown in FIG. 1 interpolates the Blue component first. According to step 125, first, the color median of blocks surrounding adjacent Blue pixels is determined. In a Bayer pattern as shown in FIG. 2, a pixel P that is Green will ordinarily have north and south neighboring adjacent pixels of Blue color. Thus, two color median values, one for the Green block surrounding the north adjacent Blue pixel and one for the block surrounding the south adjacent Blue pixel, are determined. Next, the Blue component is interpolated to be the value of the adjacent Blue pixel with the color median closest to the value of pixel P (step 135). This is in contrast to the methodology employed when pixel P is not Green in that the color median of the non-Green pixel P is used rather than the value of pixel P itself when being compared to neighboring pixel color medians. When pixel P is Green, the pixel itself is the best representation of luminance of the pixel for which missing components can be selected and thus, is used to compare against neighboring block color medians.

Next, the color median of blocks surrounding adjacent Red pixels is determined (step 145). As described above with respect to adjacent Blue pixels, in a [8-bit] Bayer pattern such as that illustrated in FIG. 2, there are two such adjacent Red pixels for whom Green block color medians are determined. Next, according to step 155, the distance, in an absolute value sense, between each color median for blocks surrounding the Red pixels and the pixel P is determined. The Red component of pixel P is interpolated to be the value of the pixel whose surrounding block color median is closest in distance to the value of pixel P (step 155). Once all R, G, B values are accounted for a given pixel P, then the R, G, B values for the pixel are stored or output (step 160) to form a full color pixel. This interpolation technique forms a full color RGB pixel, and assumes the same resolution (such as 8 bits) for the raw image pixel and each of the interpolated components.

Processing of steps 110–160 will repeat for every pixel until all pixels in the raw image have been assigned R, G, and B values. In the case of an 8-bit Bayer pattern CFA, each newly formed full color pixel may have a total resolution of 24 bits. Thus, according to step 170, this methodology checks if any more raw image pixels are remaining that have missing color components to be interpolated. If there are no more pixels that have missing color components (checked at step 170), then the interpolation process will have been completed for a given image.

The newly formed full color (RGB) pixels may be stored in an array or output (step 160) one by one to be rendered onto a display device. The full color pixels may be output for rendering on-the-fly as soon as each pixel is interpolated rather than waiting for all pixels to attain full color. Until the interpolation process is complete for all pixels, the original 8-bit Bayer pattern, at least in the relevant part, should be maintained and not overwritten in the medium where stored since the interpolation procedure may use a raw image pixel more than once before all pixels attain full value.

Interpolation that utilizes the color median of Green pixel blocks, as in this and other embodiments of the invention, better represents luminance in recovering missing color components. The resulting R, G, and B components when combined to form each full color pixel will visually more closely resemble the original color of the object prior to its image capture into the Bayer pattern CFA.

The process of interpolation may be performed when the image is about to be displayed onto a monitor or output to a peripheral device such as a printer. The methodology shown in FIG. 1 may be implemented in computer software such that an 8-bit Bayer pattern CFA image, when its pattern values are read out, can also be interpolated in a pixel-by-pixel fashion. Often, the 8-bit Bayer pattern CFA data will have been stored in a compressed format, such that the data must first be decompressed to recover the Bayer pattern values. After interpolation, the 24 bit-per-pixel resulting RGB color resolution is convenient for most display environments currently commercially available. However, the methodology of FIG. 1 can be adapted to any raw image even if it exists in a pattern other than the Bayer pattern or can be extended to attain any desired pixel color resolution and is not limited to an 8-bit to 24-bit conversion. Further, though only immediately adjacent pixels have been used to intelligently select the interpolated value of a missing color component, one skilled in the art will readily be able to modify the methodology of FIG. 1 to expand the selection set to pixels not immediately adjacent but two or more pixel locations away in distance from the pixel location whose missing color components are being interpolated.

FIG. 2 is an exemplary pixel map illustrated to explain color interpolation according to one embodiment of the invention.

FIG. 2 shows a 15×15 Bayer pattern of a typical image with 8-bit color information in each pixel location generated in a Color Filter Array (CFA) from an image sensor. The methodology described above with respect to FIG. 1 will be illustratively explained with regard to the raw image pixels shown in FIG. 2. The terminology X(m,n) will indicate a pixel X at row location m and column location n. The pixel will be represented by either an R, G, or B referring to its original color from the CFA. Neighboring pixels will be designated by the pixel color and a subscript indicating direction from the pixel X. Where no directional indicator is appropriate, pixels will be represented by color and sequential numerical identifier, e.g., G1, G2, etc.

For example, consider the Blue pixel in location (6,3) i.e., in row 6 and column 3. The pixel B(6,3) consists of Blue color information only. It is thus desirable to recover the missing Green and Red color component information for B(6,3) such that the pixel location (6,3) can become a full color (RGB) pixel. The pixel B(6,3) has four neighboring green pixels Gn (the north neighbor), Gs (south), Ge (east), Gw (west) and four neighboring red pixels Rne (the northeast neighbor), Rse (southeast), Rsw (southwest) and Rnw (northwest), as shown in FIG. 2. The neighboring Green pixels form the green color block represented by the vector G={Gn, Ge, Gs, Gw} whose color median is $\tilde{G}$, the color median of the block surrounding B(6,3). The missing Red component R for pixel location (6,3) will be interpolated by selecting one value from the set of whole surrounding pixel values Rne, Rse, Rsw and Rnw. The selection is based upon the values of color medians of the four neighboring green color blocks Gne={G1, G2, Ge, Gn}, Gse={Ge, G3, G4, Gs}, Gsw={Gw, Gs, G5, G6} and Gnw={G8, Gn, Gw, G7} centering around pixels Rne, Rse, Rsw, Rnw, respectively. The technique selects the pixel whose block color median is closest to $\tilde{G}$. The Red color pixel contained at the center of the green color block with closest color median to $\tilde{G}$ will be interpolated as the Red component for the pixel location (6,3). The missing Green color component will be interpolated as the median of the four green pixels {Gn, Ge, Gs, Gw} surrounding pixel location (6,3). Thus, when these missing components are determined, the pixel location (6,3) will have Green and Red color component information which can be combined with the Blue value of the raw image pixel at (6,3) to form a new full color pixel.

Likewise, the same procedure can be used to recover the missing Blue color component for a pixel location containing originally Red color information only. For example, the pixel at location (3,10) contains Red information only and thus needs to attain Green and Blue components through interpolation. The Blue color component of R(3,10) is chosen from one of Bne, Bse, Bsw and Bnw neighboring values, depending upon the values of the color medians $\tilde{G}ne$=median{G1, G2, G3, Gn}, $\tilde{G}se$=median{Ge, G3, G4, G2}, $\tilde{G}sw$=median{Gw, Gs, G5, G6} and $\tilde{G}nw$=median{G8, Gn, Gw, G2} centering around the Blue pixels Bne, Bse, Bsw, and Bnw respectively.

Recovery of the missing Blue and Red color components for a raw image pixel location containing Green (G) is slightly different from that of a non-Green pixel. The raw image pixel at location (11,9) contains Green originally and thus it would be desirable to interpolate missing Blue and Red components. To recover the Blue color component, the color medians $\tilde{G}n$ (for pixel Bn) and $\tilde{G}s$ (for pixel Bs) are $\tilde{G}n$=median{G1, Gne, G(11,0), Gnw} and $\tilde{G}s$=median{G(11,9), Gse, G3, Gsw}, respectively, are determined. If the absolute value difference between $\tilde{G}n$ and G(11,9) is smaller than the absolute value difference between $\tilde{G}s$ and G(11,9), Bn is selected to be the Blue color component at location (11,9), otherwise Bs is selected to be the Blue color component at that location.

To recover the missing Red color component, the technique determines the color medians $\tilde{G}w$ (for pixel Rw) and $\tilde{G}e$ (for pixel Re) which are $\tilde{G}w$=median{Gnw, G(11,9), Gsw, G4} and $\tilde{G}e$=median{Gne, G2, Gse, G}, respectively. If the absolute value difference between $\tilde{G}w$ and G(11,9) is smaller than the absolute value difference between $\tilde{G}e$ and G(11,9), Rw is chosen to be the red color component for location (11,9), otherwise Re is chosen.

In pseudo-code, the entire methodology can be described as follows:

```
begin
    if the pixel location P is not Green then
    {
        P(Green) = median{Gn, Ge, Gs, Gw};
        determine Δ1 = P̃ - G̃ne,
                  Δ2 = P̃ - G̃se,
                  Δ3 = P̃ - G̃sw,
                  Δ4 = P̃ - G̃nw;
        Find Δmin = min{|Δ1|, |Δ2|, |Δ3|, |Δ4|};
        If (Δmin = |Δ1|) then  P(Red) = Rne if Red is missing, else
                                P(Blue) = Bne if Blue is missing;
        If (Δmin = |Δ2|) then  P(Red) = Rse if Red is missing,
                                P(Blue) = Bse if Blue is missing;
        If (Δmin = |Δ3|) then  P(Red) = Rsw if Red is missing,
                                P(Blue) = Bsw if Biue is missing;
        If (Δmin = |Δ4|) then  P(Red) = Rnw if Red is missing;
                                P(Blue) = Bnw if Blue is missing;
    };
    if the pixel location P is Green (G) then
        determine Δn = G - G̃n,
                  Δs = G - G̃s,
```

-continued

```
                  Δw = G - G̃w,
                  Δe = G - G̃e
        If (|Δn| < |Δs|) then P(Blue) = Bn else P(Blue) = Bs;
        If (|Δw| < |Δe|) then P(Red) = Rn else P(Red) = Rs;
    }
end
```

Figure 4:
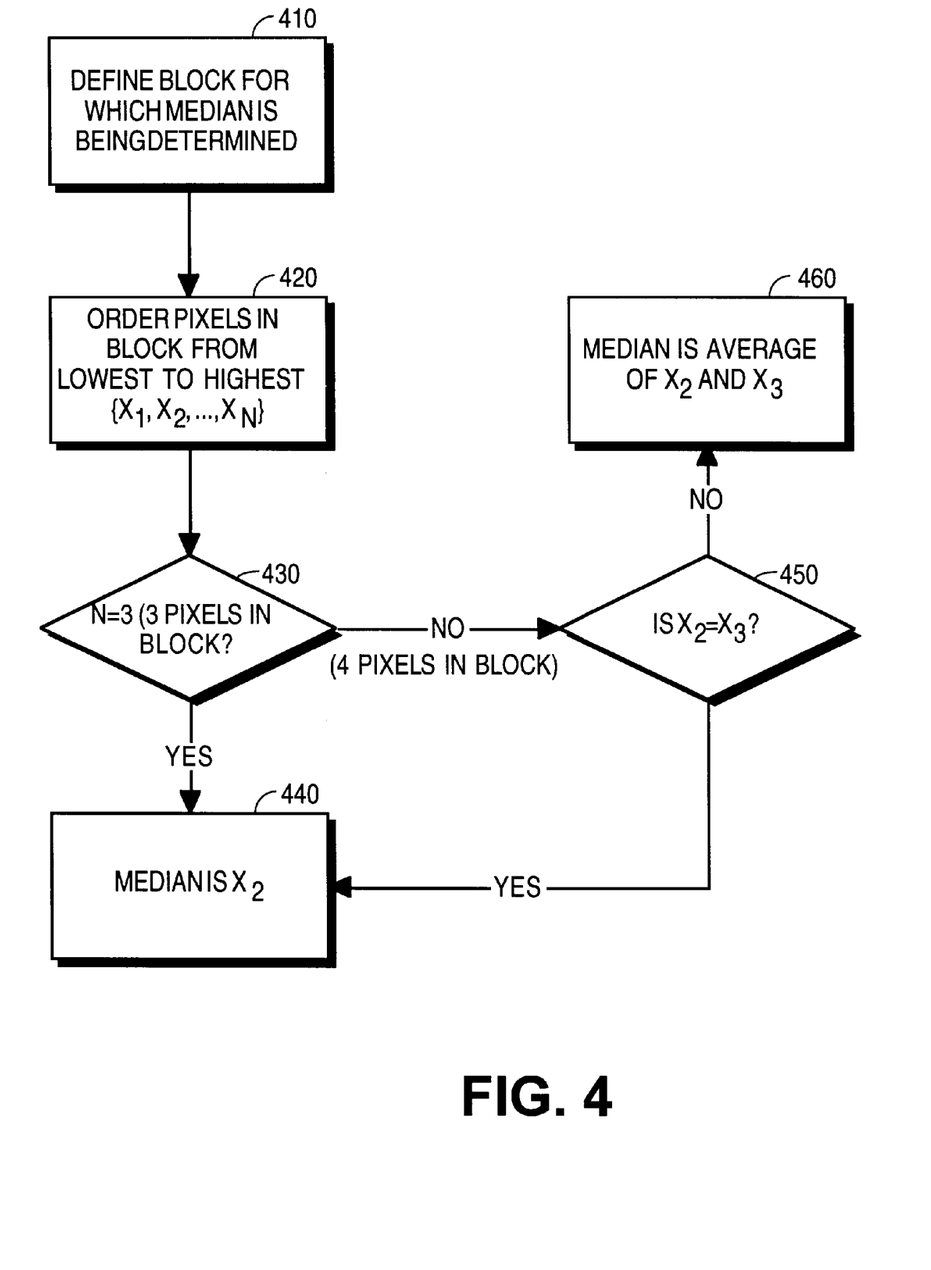
FIG. 4 illustrates a simplified methodology for determining color median according to one embodiment of the invention.

In the above pseudo code, x in P(x) represents the sought after missing color component. When the above pseudo code is In the above pseudo code, x in P(x) represents the sought after missing color component. When the above pseudo code is implemented as computer program product, several corollary steps for more efficiently determining the median as shown in FIG. 4 may be employed.

Image Boundaries

Referring again to the CFA of FIG. 2, pixel locations at the boundaries of the image, such as those in rows 1 and 15 and columns 1 and 15 do not have a complete set of four neighboring adjacent Green pixels as do the pixels at interior locations of the array such as location (6,3). The color interpolation methodology can include simplified color median techniques for certain image boundary pixels. Thus, at a corner pixel location (1,1), the Red component can be interpolated as the only adjacent Red pixel which is at location (1,2). Likewise, the Blue component from the corner pixel (1,1) can be interpolated as the only adjacent Blue pixel which is at (2,1).

For other edge pixels such as the Red pixel at location (1,2), the Green component is the median of the three adjacent Green pixels rather than a block of 4 pixels as with interior pixel locations. Determining the median of three pixel values involves less computation than does calculating the median of four pixel values. The median of pixels $\{X_1, X_2, X_3\}$ is simply $X_2$, provided that the set $\{X_1, X_2, X_3\}$ is ordered from lowest to highest, respectively.

The missing Blue component of the Red pixel at location (1,2) must be selected between the Blue pixel at (2,1) and B(2,3), the Blue pixel at location (2,3). There is a block of three surrounding Green pixels used to determine color median for pixel B(2,1) and a block of four Green pixels for the block surrounding pixel (2,3). Thus, the color median for the pixel B(2,1) will be the middle value when the set of pixel values G(1,1), G(2,2) and G(3,1) is ordered from lowest to highest. Other such boundary simplifications can be employed by one of ordinary skill in the art as is required/desired by the arrangement of periphery pixels.

Figure 3:
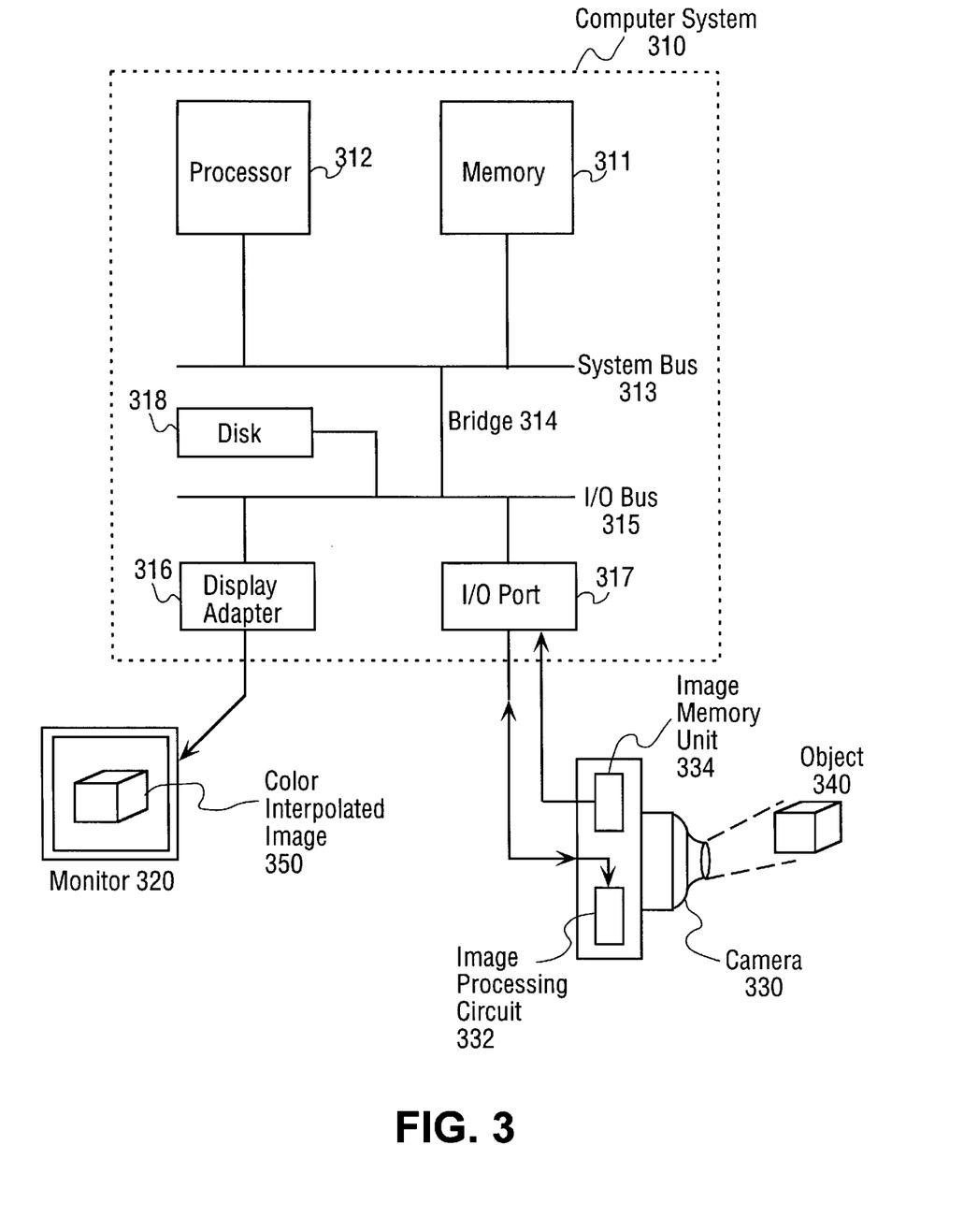
FIG. 3 is a system diagram of one embodiment of the invention.

FIG. 3 is a system diagram of one embodiment of the invention.

FIG. 3 illustrates a computer system 310, which may be any general or special purpose determining or data processing machine such as a PC (personal computer), coupled to a camera 330. Camera 330 may be a digital camera, digital video camera, or any image capture device or imaging system, and is utilized to capture a sensor image of an object 340. Essentially, captured images are compressed and processed by an image processing circuit 332 so that they can be efficiently stored in an image memory unit 334, which may be a RAM or other storage device such as a fixed disk, miniature card, etc. In most digital cameras, raw images obtained from the image capture mechanism such as a sensor are stored first on camera 330 and downloaded later to be output, displayed, or manipulated. This allows the camera 330 to capture the next object quickly without additional delay. One convenient raw image representation is the 8-bit Bayer pattern CFA shown in FIG. 2.

In one embodiment, an image is captured by camera 330 as a raw 8-bit sub-sampled Bayer pattern CFA. Color interpolation in this embodiment of the invention operates as follows. First, the sub-sampled image is downloaded from camera 330 through I/O port 317 to a disk 318 or other device on the computer system 310. The computer system performs color interpolation by executing instructions for doing so according to various embodiments of the invention.

The methodology described in the various embodiments of the invention may be executed using a processor 312 such as the Pentium™ (a product of Intel Corporation) and a memory 311, such as RAM, which is used to store/load instruction, addresses and result data. The application used to interpolate the color information of the image may be an executable module compiled from source written in a language such as C++. The instructions of that executable module, which correspond with instructions that aid in interpolating missing color component information may be stored to a disk 318 or memory 311. It would be readily apparent to one of ordinary skill in the art of computer sciences to program a determining machine to carry out the interpolation methodology described in various embodiments of the invention.

Computer system 310 has a system bus 313 which facilitates information transfer to/from the processor 312 and memory 311 and also has a bridge 314 which couples system bus 313 to an I/O bus 315. I/O bus 315 connects various I/O devices such as a display adapter 316, disk 318 and an I/O port, such as a serial port. Many such combinations of I/O devices, buses and bridges can be utilized with the invention and the combination shown is merely illustrative of one such possible combination.

When an image, such as an image of object 340, is captured, the image is sensed as R, G, and B pixels, in a CFA such as the Bayer pattern of FIG. 2. These pixel values are sent to the image processing circuit 332. Image processing circuit 332 consists of ICs and other components which execute different image processing functions. The need for color interpolation is most significant when the image is to be displayed or output and thus does not have to be performed on camera 330. When the user or application desires/requests a download of images, the sub-sampled color images stored in the image memory unit are transferred from image memory unit 334 to the I/O Port 317. I/O port 317 uses the bus-bridge hierarchy shown (I/O bus 315 to bridge 314 to system bus 313) to temporarily store the image data into memory 311 or, optionally, to disk 318.

The downloaded image will thus have pixels with missing color component information. If a full color image (each pixel having Red, Green and Blue) is desired to be output on monitor 320, then color interpolation should be employed. The downloaded sub-sampled image is analyzed pixel-by-pixel and by applying the techniques discussed above, each raw image pixel is transformed into a full color pixel. Color interpolated image 350 will appear to have a full 24-bit color resolution given adequate display devices (monitor 320 and adapter 316) will resemble the color quality of the original object 340. The interpolated missing color component values and the raw image pixel values obtained from the Bayer pattern CFA may be stored onto disk 318, memory 311 or output directly to monitor 320 after being rendered through display adapter 316.

The computer program code for color interpolation may be packaged onto a removable medium such as floppy disk or CD-ROM and may accompany software that performs the decompression of images downloaded from camera 330. As with any other software, it can be downloaded/distributed over a network on communications system, or can be available in firmware. These downloaded images can be color interpolated and stored into a useful full RGB format so that the images will more accurately visually present the object 340 to the user. Color interpolation can also be implemented in hardware where no computer system capable of executing software code is available.

In an alternative embodiment of the invention, the image processing circuit 332 can be adapted to include circuitry for performing color interpolation on-camera, such that the stored image in image memory unit 334 is a full color image. In such an embodiment, the image may be downloaded to a printer or other display device directly from camera 330 without need of an intervening data processing system like computer system 310. The downloaded image from camera 330 will already have full color since color interpolation, in this alternative embodiment of the invention, is performed on-camera during image processing.

FIG. 4 illustrates a simplified methodology for determining color median according to one embodiment of the invention.

First, when a color median is to be determined, the relevant block of pixels for which the median is being determined should be defined (step 410). When these pixel values are obtained, they may be stored in a list or array. The median is defined as a value M in a set of values wherein one half of all members in the set lie below M and the other half lies above M. Thus, the median is a determination based on the distribution of values. As such, the pixel values in the defined block should be ordered from lowest to highest (step 420). The ordered set $\{X_1, X_2, \ldots, X_N\}$ is such that $X_i \leq X_{i+1}$ for all i ranging from 1 to N−1.

Since the maximum number of pixels in any block according to the Bayer pattern and the embodiments discussed above is 4, and the minimum is 3, the median determination can be simplified. If N=3, indicating that there are 3 pixels in the block, i.e., $\{X_1, X_2, X_3\}$ (checked at step 430), then the median is $X_2$ (step 440). If N is not 3, then N must be 4 in at least one embodiment of the invention. If $X_2=X_3$ in the ordered set $\{X_1, X_2, X_3, X_4\}$ (checked at step 450) then the median again is $X_2$ (step 440). Otherwise, $X_2$ is different in value from $X_3$, and the median becomes the average (midpoint) between the values $X_2$ and $X_3$ (step 460). The above methodology can be utilized where a Bayer pattern of 8 bits (one color per pixel in the original CFA) is used and where only adjacent pixels are candidates from which an interpolated value is selected or for which medians are determined. The methodology of FIG. 4 can be readily modified to adapt to a different image array pattern, as can the interpolation techniques in the other embodiments described earlier in this detailed description.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A method comprising:
 interpolating missing color components for raw image pixel, said interpolating to include:
  if said raw image pixel is Green, applying a first interpolation methodology for interpolating Red and Blue missing color components, said first methodology to include:
   determining the color median of Green pixel blocks surrounding each of adjacent Blue pixels and surrounding each of adjacent Red pixels;

determining which adjacent Blue pixel has a surrounding block color median closest to the value of said raw image pixel, said determined adjacent Blue pixel set to be the missing Blue color component; and determining which adjacent Red pixel has a surrounding block color median closest to the value of said raw image pixel, said determined adjacent Red pixel set to be the missing Red color component; and if said raw image pixel is not Green, applying a second interpolation methodology for interpolating a missing Green color component and one of a missing Blue or Red color component; and forming a new full color pixel having full color information, said full color information consisting of said raw image pixel and said interpolated color components.

2. A method according to claim 1 wherein the color median of a block is determined by ordering pixel values within that block from lowest to highest.

3. A method according to claim 1 further comprising the steps of:

interpolating the missing Red component of said raw image pixel to be the Red pixel whose surrounding block color median is determined closest to the value of said raw image pixel; and interpolating the missing Blue component of said raw image pixel to be the Blue pixel whose surrounding block color median is determined closest to the value of said raw image pixel.

4. A method according to claim 1 wherein said second interpolation methodology includes the step of:

interpolating the missing Green component as the median of values of Green pixels adjacent to the said raw image pixel.

5. A method according to claim 1 further comprising the steps of:

determining the color median for a block surrounding said raw image pixel; and determining the color median for a block surrounding each adjacent non-Green pixel surrounding said raw image pixel.

6. A method according to claim 5 further comprising the steps of:

determining which of said color medians for adjacent non-Green pixels is the closest to said color median for a block surrounding said raw image pixel; and interpolating the missing non-Green color component as the value of non-Green pixel whose color median is determined closest to the color median of the block surrounding said raw image pixel.

7. A method according to claim 1 wherein raw image pixels located in image corners have non-Green color components interpolated to be adjacent non-Green pixel values.

8. A method according to claim 1 wherein said image is arranged in a Bayer pattern.

9. A method according to claim 1 wherein the steps of interpolating and forming are repeatedly performed for each pixel contained in said raw image.

* * * * *